United States Patent [19]
Enomoto

[11] Patent Number: 5,653,325
[45] Date of Patent: Aug. 5, 1997

[54] CONVEYOR SYSTEM FOR DIVERGENCE AND CONVERGENCE

[75] Inventor: Masahiro Enomoto, Komaki, Japan

[73] Assignee: Daifuku Co., Ltd., Osaka, Japan

[21] Appl. No.: 375,924

[22] Filed: Jan. 20, 1995

[30] Foreign Application Priority Data

Mar. 24, 1994 [JP] Japan .................................. 6-052365
Oct. 17, 1994 [JP] Japan .................................. 6-249885

[51] Int. Cl.$^6$ .................................................. B65G 13/10
[52] U.S. Cl. .................... 198/369.4; 198/782; 193/36
[58] Field of Search .............................. 198/361, 369.4, 198/370.03, 370.09, 782, 787; 193/36

[56] References Cited

U.S. PATENT DOCUMENTS

| | | | |
|---|---|---|---|
| 2,136,267 | 11/1938 | Taylor | 198/127 |
| 2,794,529 | 6/1957 | Schmitz | 193/36 |
| 3,343,639 | 9/1967 | Eliassen et al. | 193/36 |
| 4,111,412 | 9/1978 | Cathers | 198/782 X |
| 4,815,588 | 3/1989 | Katsuragi et al. | 198/782 X |

FOREIGN PATENT DOCUMENTS

| | | |
|---|---|---|
| 0944480 | 6/1956 | Germany ................ 193/36 |
| 3044136A1 | 11/1980 | Germany . |
| 4-280711 | 6/1992 | Japan . |
| 1060170 | 11/1964 | United Kingdom . |

*Primary Examiner*—James W. Keenan
*Attorney, Agent, or Firm*—Barnes, Kisselle, Raisch, Choate, Whittemore & Belknap, P.C.

[57] ABSTRACT

To provide a conveyor system for divergence and convergence, which is capable of always satisfactorily diverging or converging articles without regard to their size. When the roller axes 19 are orthogonal to the transport path 9, an article 60 to be transported is transported downstream by the rollers 16 without being sorted. When it is desired to sort the article 60, an angle changing device 30 is actuated to individually change the angles of inclination of the rollers 16, such that those rollers which are disposed in the upstream region are given a smaller angle of inclination, the angle of inclination being gradually increased. Diversion of the article can be effected such that it has its direction of orientation gradually changed from a smaller angle to a larger angle while it is gradually moved to one side by a smaller amount to a larger amount. The article 60 can be subjected not to an early (sharp) diverging action but to a sufficient diverging action; thus, it can always be satisfactorily diverged without regard to its size. It can always be satisfactorily converged by the reverse operation.

3 Claims, 11 Drawing Sheets

CONVEYOR SYSTEM FOR DIVERGENCE AND CONVERGENCE

FIELD OF THE INVENTION

The present invention relates to a conveyor system for divergence and convergence which is utilized by being installed e.g., in a cargo collecting station to sort a number of articles collected therein by their destinations.

BACKGROUND OF THE INVENTION

As for this kind of system, there has heretofore been provided a diverter apparatus as found e.g., in Japanese Patent Application Kokai Hei 4-280711. In this conventional arrangement, a diverging conveyor is installed laterally outwardly of a main conveyor, said main conveyor comprising a frame and a plurality of rollers. The rollers comprise transport rollers disposed at the opposite ends as seen in the direction of transport and attached to the frame, and guide rollers disposed in the intermediate region as seen in the direction of transport and attached to a pair of hanger bases.

The hanger bases are adapted to be moved in mutually opposite directions by driving means, such movement causing the axes of the guide rollers to be disposed parallel to the axes of the transport rollers, thereby directly transporting articles without diverging them onto the diverging conveyor. Further, the articles can be diverged onto the diverging conveyor by inclining the axes of the guide rollers with respect to the axes of the transport rollers.

According to the conventional arrangement described above, there has been a problem that since the guide rollers are inclined at the same angle, all the articles of different sizes cannot be smoothly diverged. That is, if the angle of inclination and the transfer rate are set according to the articles of larger size, the articles of smaller size are subjected to the diverging action earlier (sharply) and excessively turned, so that they are caused to excessively change their directions of orientation or collide with the frame of the diverging conveyor. Further, if the angle of inclination and the transport rate are set according to the articles of smaller size, larger articles are not sufficiently subjected to the diverging action, so that they fail to diverge. Further, if the angle of inclination and the transport rate are set according to the articles of intermediate size, the articles of larger and smaller sizes undergo incomplete divergence. Further, shorter transfer rollers or guide rollers have to be installed outwardly of the end guide rollers in order to prevent the falling of articles; thus, the use of rollers different in length complicates the manufacture and assembly.

DISCLOSURE OF THE INVENTION

An object of the present invention is to provide a conveyor system for divergence and convergence which is capable of always satisfactorily diverging or converging articles to be transported without regard to their size.

To achieve the above object, a conveyor system for divergence and convergence according to the invention comprises a plurality of rollers which are disposed with respect to the machine frame such that they can be individually shifted between a first position in which the roller axes are orthogonal to the direction of the transport path and a second position in which the roller axes are inclined with respect to the direction of the transport path, an angle changing device for individually changing the angles of inclination of the rollers, and a rotation imparting device operatively connected to the rollers and disposed on the machine frame.

According to the arrangement of the invention described above, the transport path can be defined by forcibly rotating the rollers by the rotation imparting device. And in the neutral position where the roller axes of the rollers are orthogonal to the direction of the transport path, the articles can be directly transported downstream by the rollers without being sorted.

When it is desired to sort articles, the angle changing device is actuated by a divergence command, whereby the angles of inclination of the rollers are changed individually, that is, the angle of inclination is smaller on the upstream side and is gradually increased.

As a result of inclining the rollers in this manner, articles transported from the upstream side are caused by the rollers of smaller angle of inclination to gradually change their directions of orientation by a smaller angle relative to the transport distance and to move gradually to one side by a smaller amount. And the rollers of medium angle of inclination cause the articles to gradually change their directions of orientation by a little larger angle relative to the transport distance and to gradually move to one side by a little larger amount. Further, the rollers of larger angle of inclination cause the articles to gradually change their directions of orientation by a larger angle relative to the transport distance and to move to one side by a larger amount. Thereby, the articles are subjected to sufficient diverging action rather than to earlier (sharp) diverging action; thus, articles can always be satisfactorily diverted without regard to their size. Further, since the angle of inclination on the upstream side can be made smaller, short rollers for relay can be dispensed with and the manufacture and assembly can be facilitated.

In addition, operating the angle changing device in the reverse of the manner described above makes it possible to incline the rollers in the same manner but in the opposite direction, so that articles can be discharged outwardly of the other side for sorting. Further, in a similar disposition, the direction of transport can be changed by the reverse operation of the rotation imparting device, whereby the articles can always be satisfactorily converged from outside on either the right-hand side or the left-hand side without regard to their size.

In a first preferred embodiment of the invention, an auxiliary conveyor for divergence and convergence is installed laterally outwardly of the main conveyor comprising inclinable rollers and it is arranged that the rollers have their angles of inclination gradually increased as the auxiliary conveyor is approached.

According to this first embodiment, the rollers can be inclined such that their angles of inclination are smaller on the upstream side and are gradually increased as the auxiliary conveyor is approached. Therefore, articles on the main conveyor transported from the upstream side are gradually moved sideways as they are gradually changing their directions of orientation under the action of the rollers of smaller angle of inclination, and then the articles can be moved sideways by a greater amount by the rollers of greater angle of inclination while they are gradually changing their directions of orientation. Thereby, divergence and convergence of articles can always be satisfactorily effected between the main conveyor and the auxiliary conveyor disposed laterally outward thereof without regard to their size.

In a second preferred embodiment of the invention, the rollers are divided into groups associated with a plurality of zones, and the rollers in the group in the zone adjacent the auxiliary conveyor are adapted to be inclined at the same angle in the same direction.

According to this second embodiment, the directions of orientation of the rollers in the group adjacent the auxiliary conveyor can be changed by a simple device and in a simple operation.

In a third preferred embodiment of the invention, the rollers are divided into groups associated with a plurality of zones, and the rollers in the group in the zone adjacent the auxiliary conveyor are adapted to be inclined at the same angle in the same direction, while the rollers in the groups in the remaining zones are adapted to have their angles of inclination gradually increased as the auxiliary conveyor is approached, the change of the angle of inclination being individually made.

According to this third embodiment, articles transported from the upstream side can be changed in their directions of orientation by a gradually increasing angle by the remaining zone roller groups and can be moved to one side by a gradually increasing amount. And they can be changed in their directions of orientation by a greater angle by the rollers in the group in the zone adjacent the auxiliary conveyor and can be moved to one side by a greater amount.

In a fourth preferred embodiment of the present invention, a plurality of rollers are freely rotatably supported in their respective roller frames with the roller axes transversely directed, the roller frames being rotatably attached to the machine frame through respective vertical shafts.

According to this fourth embodiment, the actuation of the angle changing device rotates the roller frames through the vertical shafts in the same direction through a predetermined angle, thereby facilitating the inclination of the rollers.

In a fifth preferred embodiment of the invention, the machine frame is provided with support members opposed from below to the end portions of the roller frames.

According to this fifth embodiment, when the support transport of articles is not being performed, or when articles are being supported and transported downstream in the transport path without being sorted, there is no eccentric load on the rollers or on the roller frames; therefore, the ends of the roller frames are opposed to the support members with small clearances therebetween. When articles are sorted to be directed to the auxiliary conveyor, the clearances (plays) produced around the vertical shafts which effect one-point support at the center or the weight of articles causes the roller frames to deform and incline such that their ends associated with the sorting side assume a lower level; however, at this time, the ends are supported by the support members, so that further deformation or inclination can be prevented. Therefore, the sorting movement from the main conveyor to the auxiliary conveyor can always be smoothly effected without regard to the weight of articles or other factors.

In a sixth preferred embodiment of the present invention, the angle changing device comprises connecting members for mutually swingably connecting adjacent roller frames, and a swing imparting device operatively connected to at least one roller frame.

According to this sixth embodiment, the actuation of the swing imparting device of the angle changing device can rotate at least one roller frame through the vertical shaft, the rotation of said one roller frame being transmitted to the other roller frames through the connecting members, whereby these roller frames can be automatically rotated in the same direction through the vertical shafts. By paying due consideration to the disposition and arrangement of the connecting members, the angles of inclination of the rollers can be individually changed, that is, the angle of inclination can be made smaller for the upstream side and gradually increased as the auxiliary conveyor is approached.

In a seventh preferred embodiment of the invention, the connecting positions of the connecting members relative to the roller frames can be changed in the direction of the roller axes.

According to this seventh embodiment, by changing the connecting positions of the connecting members relative to the roller frames in the direction of the roller axes, the roller frames having rollers attached thereto can be disposed at any desired positions and the need for selection at the time of assembly can be eliminated.

DESCRIPTION OF THE PREFERRED EMBODIMENTS

An embodiment of the present invention will now be described with reference to FIGS. 1 through 7.

Figure 1:
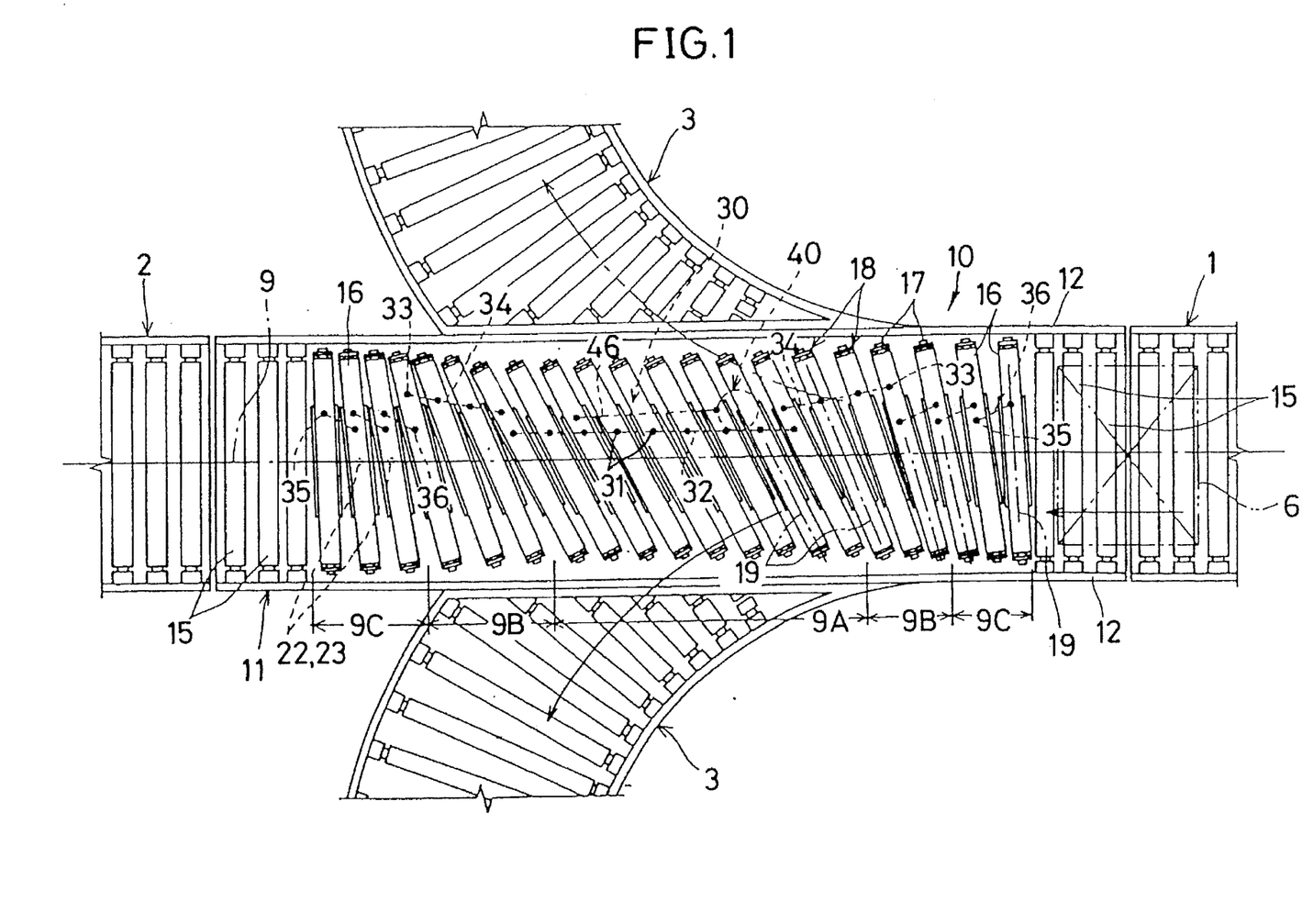
FIG. 1 is a schematic plan view of an embodiment of the present invention, showing the diverging action of a conveyor system for divergence and convergence.
Figure 2:
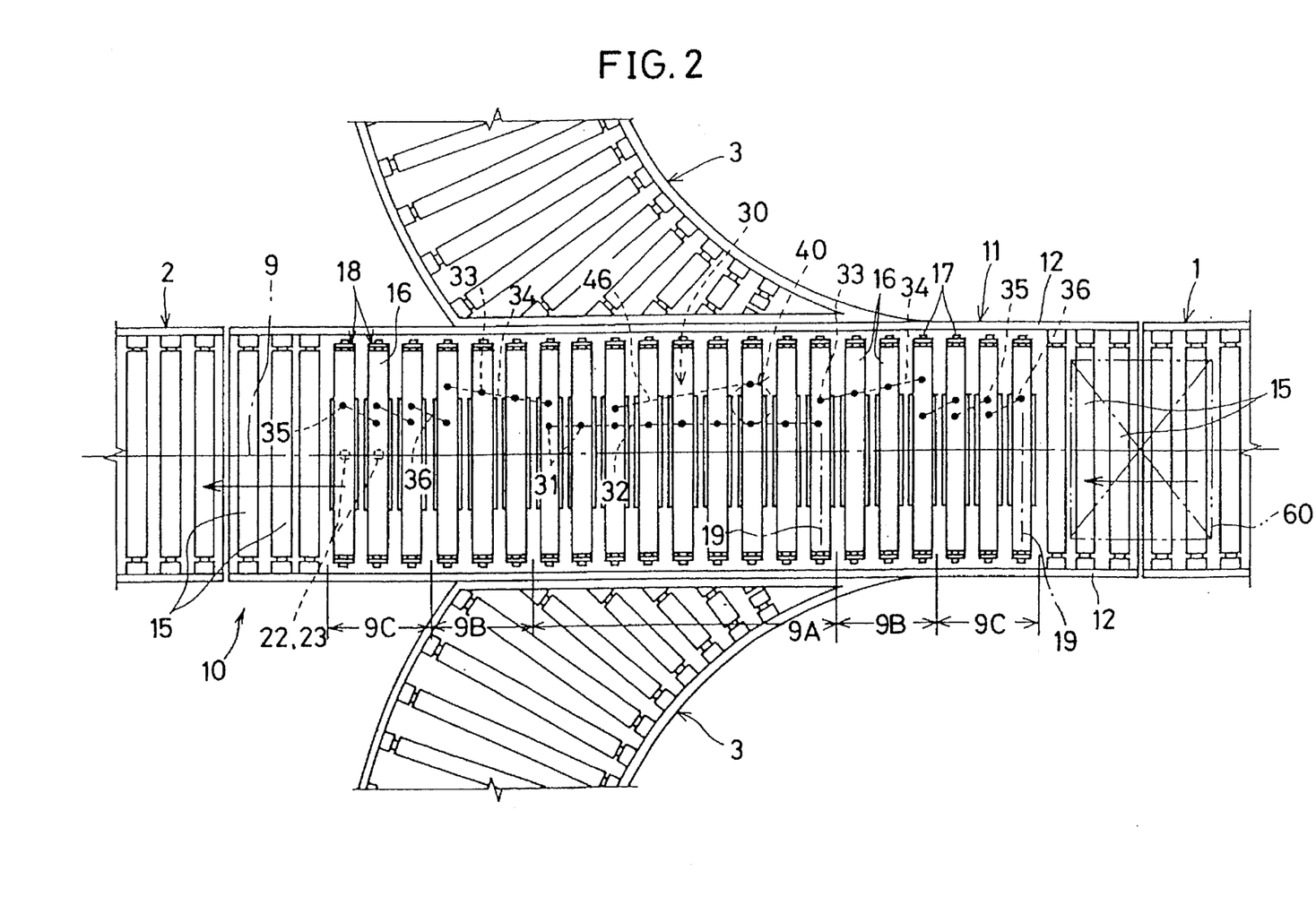
FIG. 2 is a schematic plan view of said conveyor system for divergence and convergence, showing the direct transport.
Figure 3:
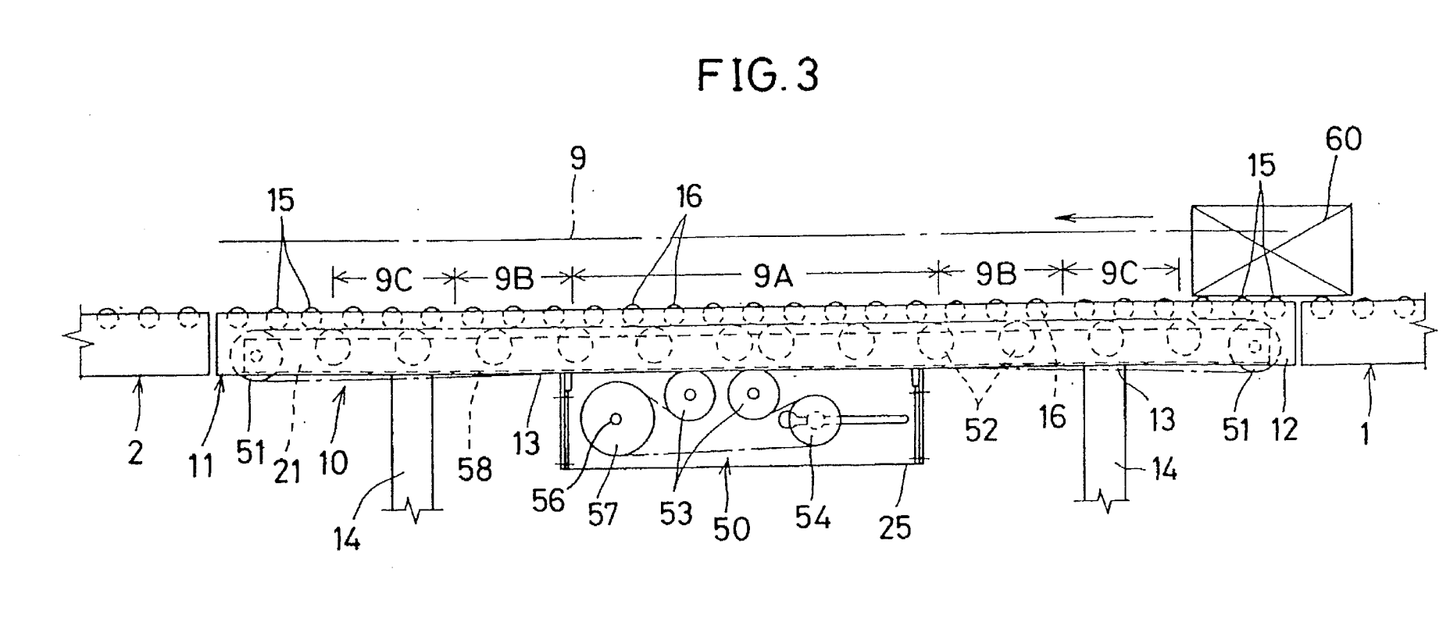
FIG. 3 is a side view of said conveyor system for divergence and convergence.
Figure 4:
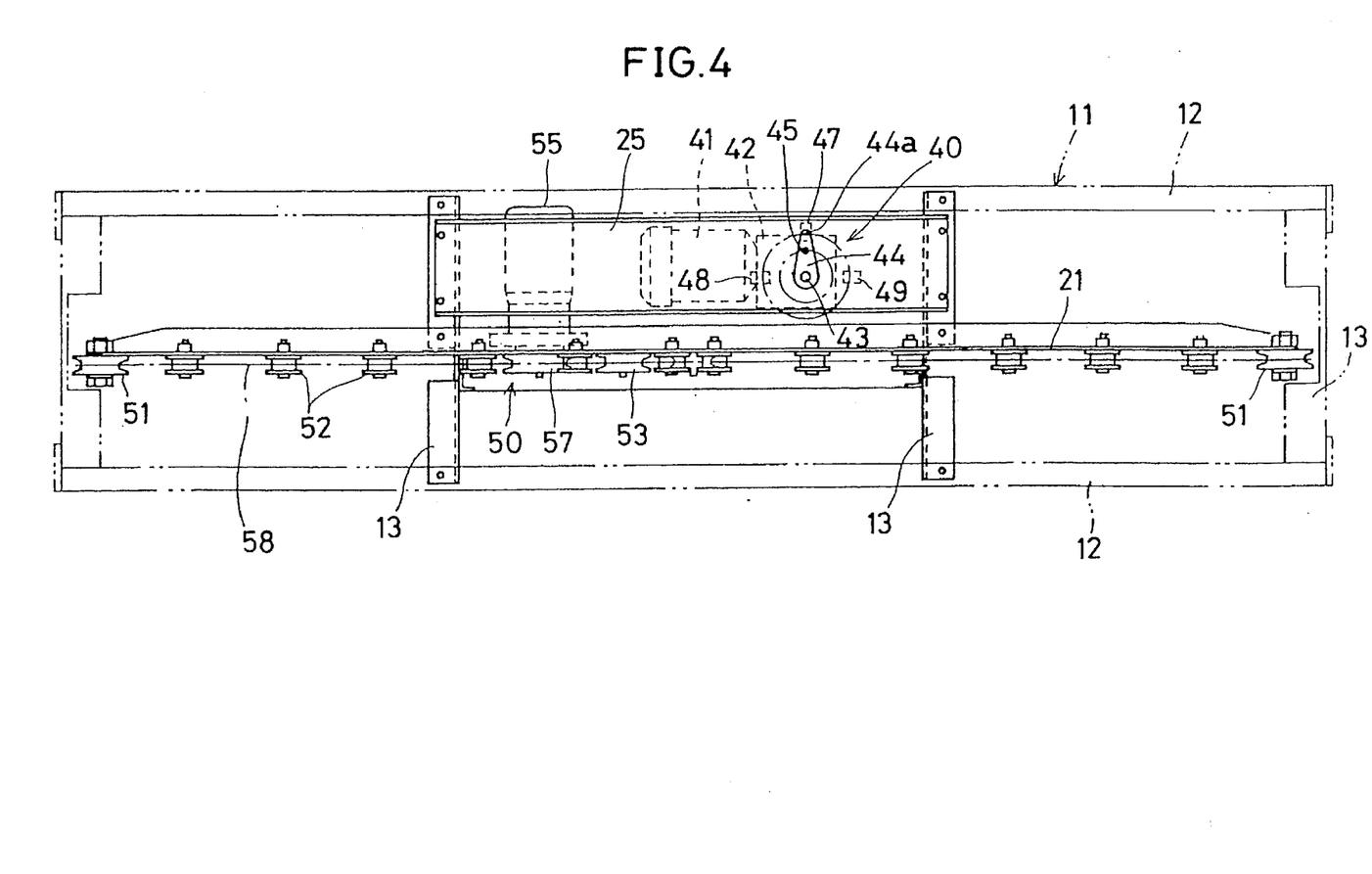
FIG. 4 is a plan view of the rotation imparting device section of said conveyor system for divergence and convergence.
Figure 5:
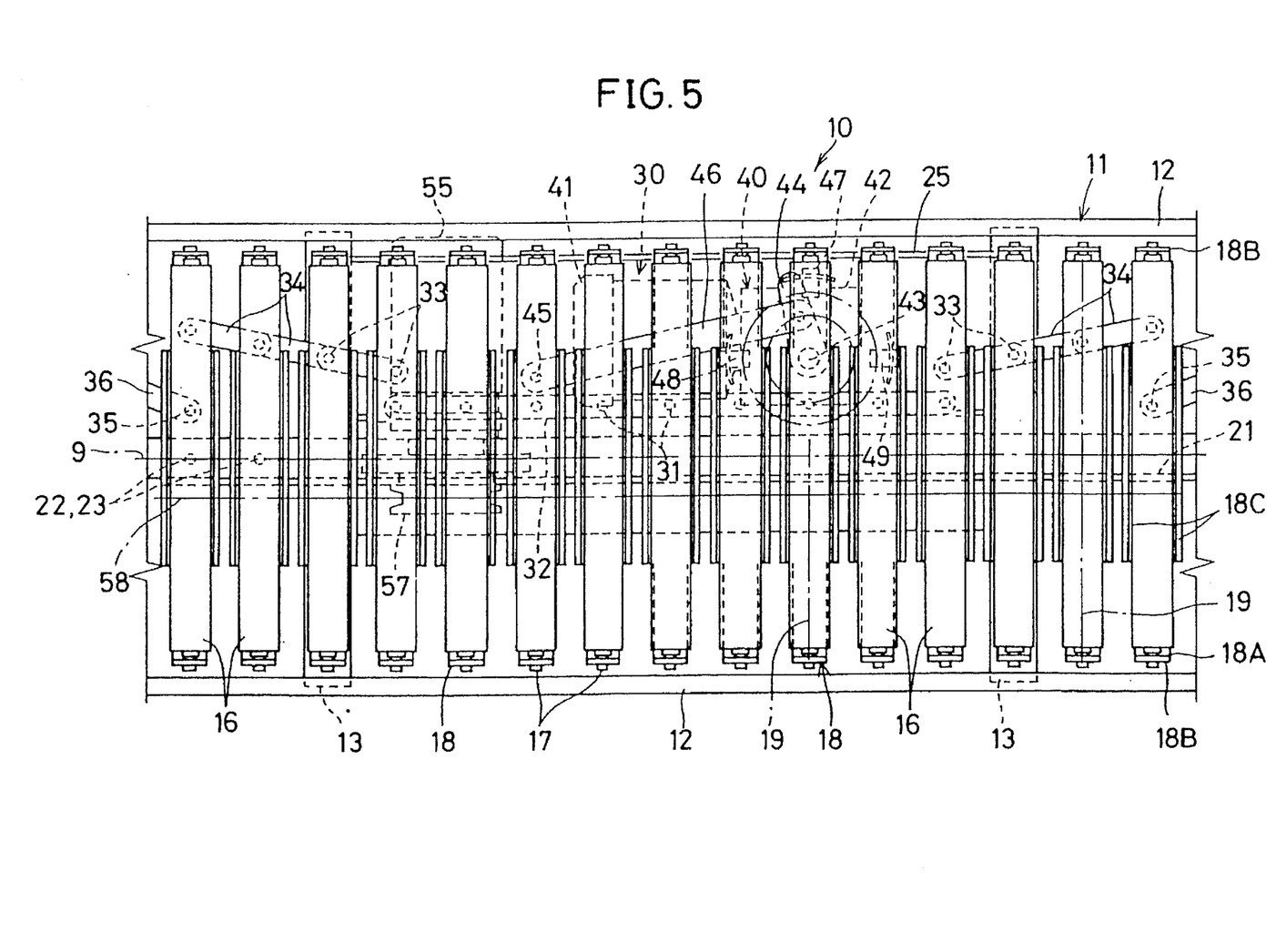
FIG. 5 is a plan view of the central zone of said conveyor system for divergence and convergence.
Figure 6:
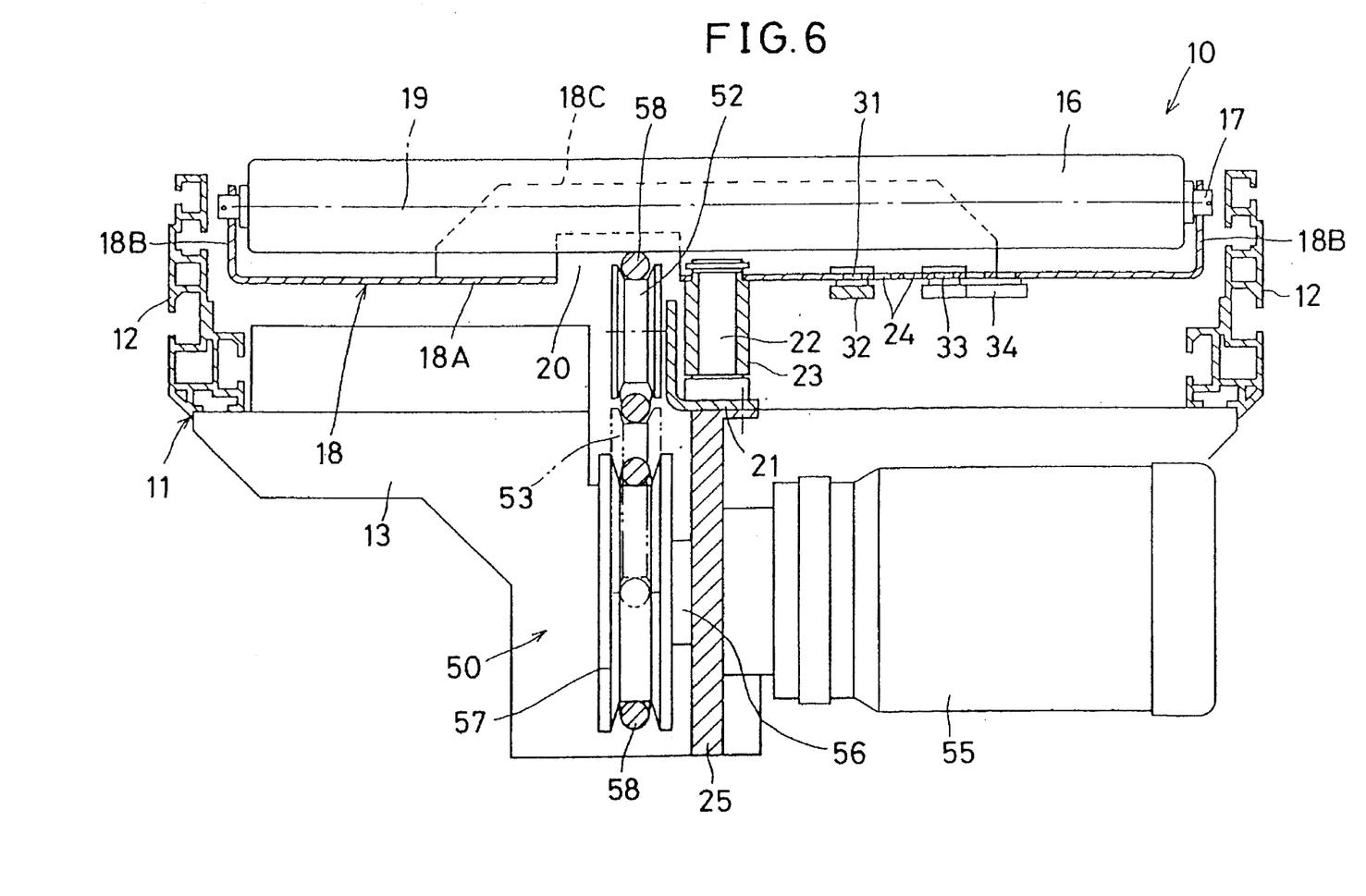
FIG. 6 is a front view, partly broken away, of the principal portion of said conveyor system for divergence and convergence.
Figure 7:
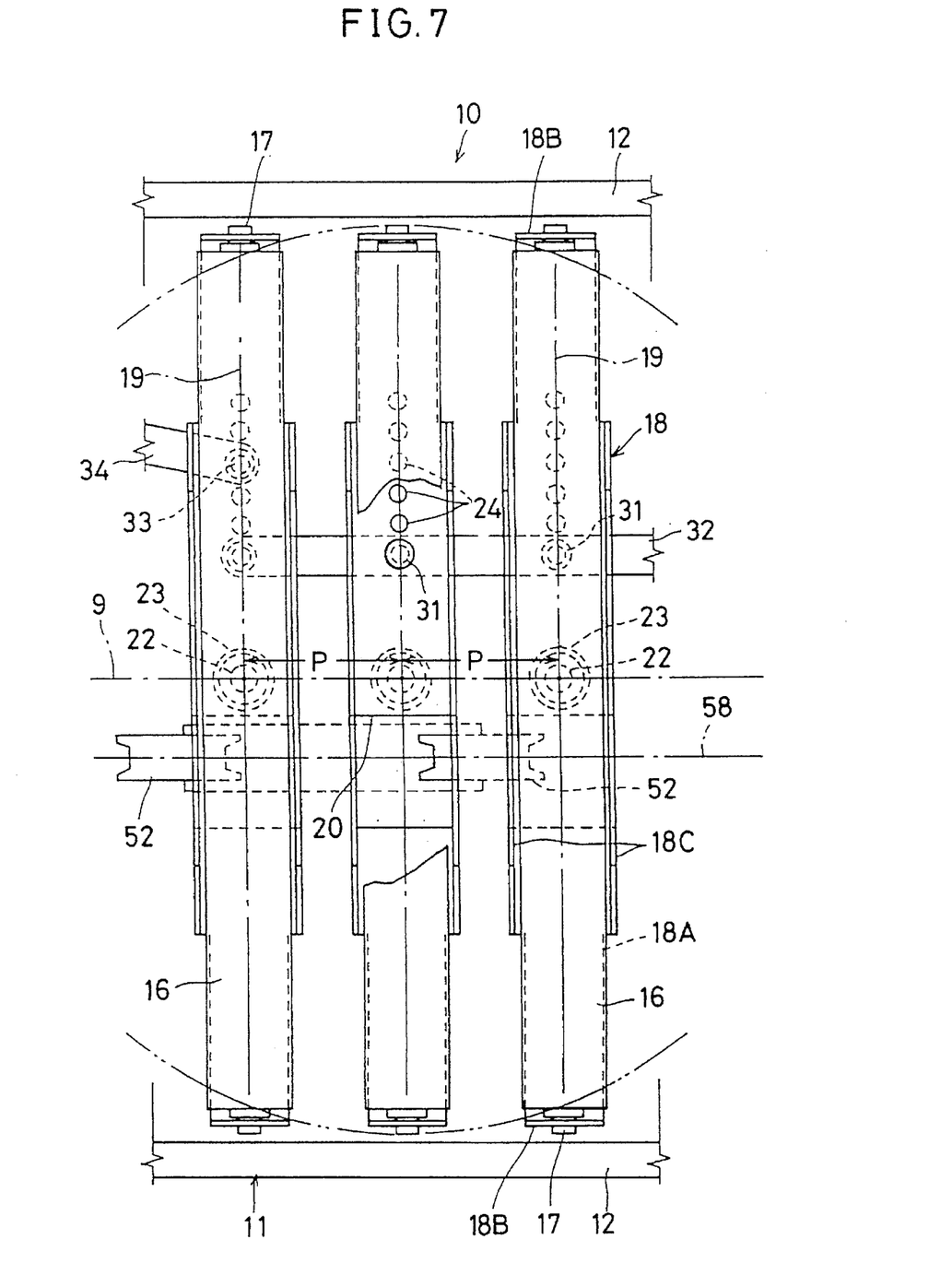
FIG. 7 is a plan view of the principal portion of said conveyor system for divergence and convergence.

In FIGS. 1 and 3, the numeral 10 denotes a main conveyor and a carry-in conveyor 1 is disposed upstream thereof and a carry-out conveyor 2 is disposed downstream of said main conveyor, with auxiliary conveyors 3 for divergence respectively disposed outwardly of the opposite sides of the intermediate portion. In this case, the drive roller conveyor type is employed for the carry-in conveyor 1, carry-out conveyor 2 and auxiliary conveyors 3. The machine frame 11 of said main conveyor 10, as shown in FIGS. 2 through 7, comprises a pair of conveyor frames 12, a plurality of transverse members 13 connecting the two conveyor frames 12 between their lower portions, and leg members 14 depending from suitable transverse members 13. And a plurality of rollers disposed between the two conveyor frames 12 in the direction of a transport path 9 are divided into a group of stationary rollers 15 and a group of intermediate movable rollers 18, which groups are rotatably supported in the two conveyor frames 12 in the upstream and downstream sides of the transport path 9.

These movable rollers 16 are freely rotatably fitted on roller shafts 17, the latter being supported respectively in roller frames 18, whereby the movable rollers 18 are freely rotatably supported in their respective roller frames 18 with their roller axes 19 transversely directed. Each roller frame 18 is formed by a bottom plate 18A, lateral plates 18B continuously extending upward from the right and left ends of said bottom plate 18A, and front and rear plates 18C continuously extending upward from the front and rear ends of said bottom plate 18A, with the roller shaft 17 supported between said lateral plate 18B. And in the intermediate region of the conveyor as seen in the direction of the width, an upwardly concave portion 20 is formed which extends from the bottom plate 18A to the front and rear plates 18C, so as to expose the lower portion of the movable roller 18 downwardly through this concave portion 20.

Each movable roller 18 is individually shiftable between a first position where the roller axis 19 is orthogonal to the direction of the transport path 9 and a second position where the roller axis 19 is inclined with respect to the direction of the transport path 9.

That is, in the central region of the conveyor as seen in the direction of the width and below the groups of rollers 15 and 16, a longitudinal member 21 is installed above and between the transverse members 13 and over the entire length of the transport path 9. And vertical shafts 22 are erected at a plurality of locations on the longitudinal member 21 spaced at intervals of a predetermined pitch P as seen in the direction of the transport path 9. Cylindrical bodies 23 rotatably fitted on said vertical shafts 22 are fixed at their upper portions to the bottom plates 18A of said roller frames 18, whereby the roller frames 18 are rotatably attached to the machine frame 11 through the vertical shafts 22.

The transport path 9 is divided into zones: a central zone 9A defined in the central region as seen in the direction of the transport path by a plurality (9, in the embodiment) of movable rollers 16, intermediate zones 9B defined upstream and downstream of this central zone 9A by a plurality (3, in the embodiment) of movable rollers 16, and end zones 9C defined upstream and downstream of said intermediate zones 9B by a plurality (3, in the embodiment) of movable rollers 16. And said auxiliary conveyors 3 are installed laterally outwardly of the central zone 9A.

An angle changing device 30 is installed for individually changing the angles of inclination of said movable rollers 16. That is, the angle changing device 30 comprises connecting members for relatively swingably connecting adjacent roller frames 18, and a swing imparting device operatively connected to at least one roller frame 18.

The connecting members are in link form, comprising a central connecting member 32 connected between the lower surfaces of the roller frames 18 of said central zone 9A by vertical pins 31, a plurality (3, in the embodiment) of intermediate connecting members 34 connected between the lower surface of the roller frame 18 at one end of the central zone 9A and the lower surfaces of the roller frames 18 in each intermediate zone 9B by vertical pins 33, and a plurality (3, in the embodiment) of end connecting members 36 connected between the lower surface of the roller frame 18 at one end of each intermediate zone 9B and the lower surfaces of the roller frames 18 in each end zone 9C by vertical pins 35.

In this case, when the roller axes 19 of the movable rollers 16 are orthogonal to the direction of the transport path 9, the central connecting member 32, which is long in size and used in common, is disposed parallel to the transport path 9. Further, the intermediate connecting members 34 which are three in number are used and the vertical pins 33 are disposed in a straight line such that those disposed more upstream or more downstream are positioned closer to the outer side. Further, the end connecting members 36 which are three in number are used and the vertical pins 35 are disposed such that those on the inner and outer sides, respectively, are aligned with each other and those disposed more upstream or more downstream are positioned closer to the outer side.

As a result of such arrangement and disposition of the connecting members 32, 34, 36 and vertical pins 31, 33, 35, when at least one roller frame 18 is inclined or turned around the vertical pin 22 by the swing imparting device, those of the movable rollers 16 that are disposed closer to the auxiliary conveyors 3, i.e., the movable rollers 16 which are in the central zone 9A, are inclined or turned at a larger angle.

In addition, the bottom plate 18A of the roller frame 18 is formed with a plurality of vertical pin connecting holes 24 spaced in the direction of the roller axis 19; therefore, the connecting positions of the connecting members 32, 34, 36 with respect to the roller frames 18 can be shifted in the direction of the roller axis 19. Thereby, the roller frame 18 having the movable roller 16 attached thereto can be disposed at a desired position in any of the zones 9A, 9B and 9C, eliminating the need for predetermined disposition at the time of assembly.

A base frame 25 is installed between the transverse members 13 in the central region, on which base member 25 is installed said swing imparting device 40. This swing imparting device 40 is in crank form, comprising a reversible driving unit (motor or the like) 41 mounted on the base frame 25, a speed reduction unit 42 operatively connected to said driving unit 41, an output shaft 43 extending upwardly from the speed reduction unit 42, a crank arm 44 fixed on said output shaft 43, and a crank link 46 connected between the free end of the crank arm 44 and one roller frame 18 (in the central zone 9A) through a vertical pin 45. In addition, a detected portion 44a is installed on the free end of the crank arm 44 and there are a plurality of detectors for detecting said detected portion 44a, i.e., a neutral detector 47, a first inclination detector 48 on one side and a second inclination detector 49 on the other side.

Disposed on the side of the machine frame 11 is a rotation imparting device 50 operatively connected to the rollers 15 and 16. That is, driven wheels 51 are freely rotatably installed at the opposite ends of the longitudinal member 21 and a plurality of support wheels 52 are freely rotatably installed between the driven wheels 51. Further, a pair of guide wheels 53 and a tension wheel 54 are freely rotatably installed on said base frame 25 and a driving wheel 57 is attached to an output shaft 56 from a reversible drive unit (a motor equipped with a speed reduction unit) 55 mounted on the base frame 25.

A belt 58 is entrained over the wheels 51, 52, 53, 54, 57 which are rotated around the axes of transverse shafts. The portion of the belt 58 positioned in the upper region between the driven wheels 51 is supported from below and pressed against the lower portions of the rollers 15 and 16 through the recess 20 by the support wheels 52. These member 51 through 58 form an example of the rotation imparting device 50.

The function of the embodiment described above will now be described.

In operation, the drive unit 55 of the rotation imparting device 50 drives the driving wheel 57 through the output shaft 56, thereby moving the belt 58 along the transport path 9 through the wheels 51, 52, 53 and 54. The force of this movement of the belt 58 is transmitted to the rollers 15 and 16, thereby forcibly rotating the rollers 15 and 16.

As shown in FIG. 2, in the neutral state in which the roller axes 19 of the movable rollers 16 are orthogonal to the direction of the transport path 9, an article 60 to be transported which is fed from the carrying-in conveyor 1 to the main conveyor 10 is first supported and transported by the stationary rollers 15 which are being driven. Whether or not the article is to be sorted is determined, e.g., by being set by a setting unit when it is fed into the line or by a bar code which is read before or after the article is fed to the main conveyor.

That is, when it is not to be sorted, the absence of a diversion command allows the movable rollers 16 to maintain their neutral state, so that the article 60 fed in from the upstream side is supported and transported directly from the movable rollers 18 to the downstream stationary rollers 15 and to the carrying-out conveyor 2.

And when it is desired to sort the article 60 for transfer to either of the auxiliary conveyors 3, the angle changing device 30 is forwardly or backwardly actuated by a divergence command. That is, the driving unit 41 of the swing imparting device 40 is forwardly or backwardly actuated to turn the crank arm through 90 degrees. Thereby, for example, the crank link 46 is pushed downstream, whereby one roller frame 18 to which the crank link 46 is connected is turned through the vertical shaft 22.

The turning movement of this one roller frame 18 is transmitted to the roller frames 18 in the central zone 9A through the central connecting member 32, thereby turning these roller frames 18 in the same direction through the same angle through the vertical shafts 22, e.g., as shown in FIG. 1. Thereby, the movable rollers 16 in the central zone 9A are inclined in the same direction through the same angle to have a larger angle.

And the inclination turning of the roller frames disposed at the opposite ends of the central zone 9A is transmitted to the roller frames 18 in the intermediate zones 9B through the intermediate connecting members 34, thereby turning these roller frames 18 through the vertical shafts 22. In this case, the intermediate connecting members 34 are disposed in a straight line such that those vertical pins 33 which are disposed more upstream or downstream are disposed further outside; therefore, as a result of the disposition or arrangement of the vertical pins 33 and the intermediate connecting members 34, the roller frames 18 and hence the movable rollers 16 are inclined such that those which are disposed in the central zone 9A are inclined at a greater angle and those which are disposed in the end zones 9C are inclined at a smaller angle. In addition, the angle of inclination in the intermediate zones 9B is smaller than that in the central zone 9A.

Further, the inclination turning of the roller frames 18 disposed at the opposite ends of the intermediate zones 9B is transmitted to the roller frames 18 in the end zones 9C through the end connecting members 36, thereby turning these roller frames 18 through the vertical shafts 22. In this case, the end connecting members 36 have the vertical pins 35 disposed such that those vertical pins 35 which are disposed inner and outer sides, respectively, are aligned with each other and those disposed more upstream or downstream are disposed further outward; therefore, as a result of the disposition or arrangement of the vertical pins 35 and the end connecting members 36, the roller frames 18 and hence the movable rollers 16 are inclined such that those which are disposed in the intermediate zones 9B are inclined at a greater angle and those which are closer to the ends are inclined at smaller angle. In addition, the angle of inclination in the end zones 9C is smaller than that in the intermediate zones 9B.

Inclining the movable rollers 16 in this manner assures that the article 60 fed in from the upstream side first has its direction of orientation gradually changed through a smaller angle relative to the distance of transport and is gradually moved by a smaller amount to one side by the movable rollers 16 inclined at a smaller angle in the end zones 9C. And it has its direction of orientation gradually changed through a little larger angle relative to the distance of transport and is gradually moved by a little greater amount to one side by the movable rollers 16 inclined at a medium angle in the intermediate zone 9B.

Further, it has its direction of orientation gradually changed through a larger angle relative to the distance of transport and is moved by a larger amount to one side by the movable rollers 16 inclined at a larger angle in the central zone 9A; thus, the article 60 can be sorted and discharged to the auxiliary conveyor 3 disposed on one side, as indicated by a solid line arrow in FIG. 1.

Further, operating the angle changing device 30 in the reverse of the manner described above makes it possible to incline the movable rollers 16 in a similar manner but in the opposite direction, whereby the article 60 can be sorted for transfer to the auxiliary conveyor 3 on the opposite side, as indicated by a phantom line arrow in FIG. 1. In addition, the return from the inclined state to the neutral state can be likewise effected.

Figure 8A:
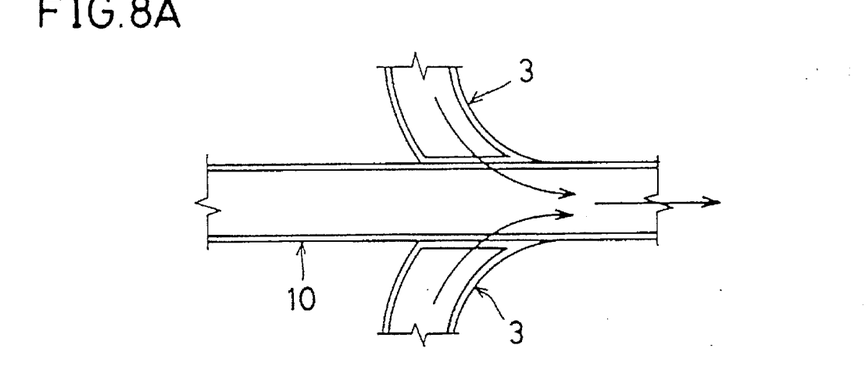
FIG. 8 is a schematic plan view showing other forms for embodying the invention, wherein A through D respectively show usage forms of the conveyor system for divergence and convergence.

In the above embodiment, the operation has been described in which diversion (sorting) from the main conveyor 10 to either of the right and left auxiliary conveyors 3 is effected; however, in a similar arrangement, the article 60 can be converged to the main conveyor 10 from either of the right and left auxiliary conveyors 3, as shown in FIG. 8A, by changing the transport direction of the main conveyor 10 by reversely operating the drive unit 55.

Figure 8B:
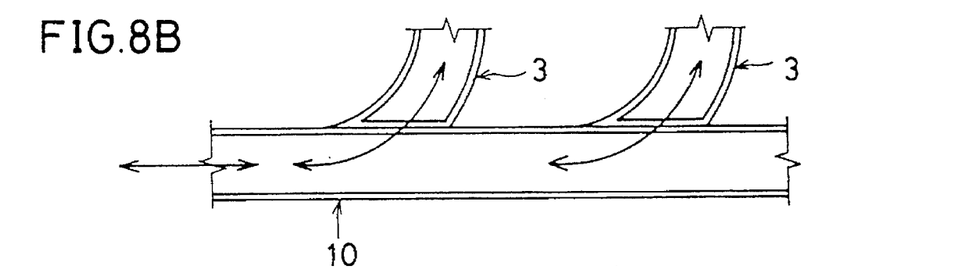
Figure 8C:
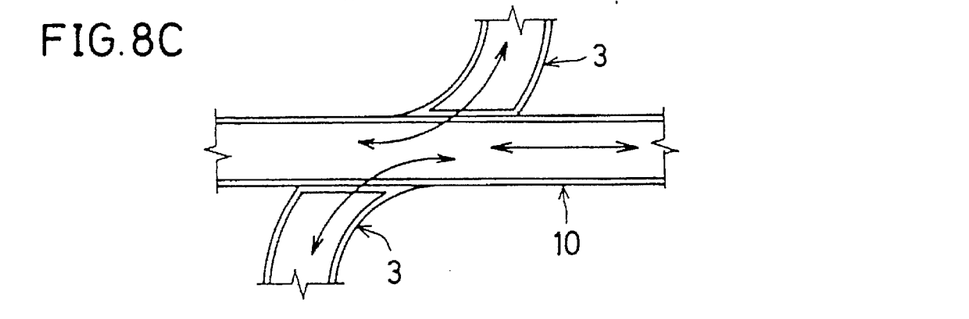
Figure 8D:
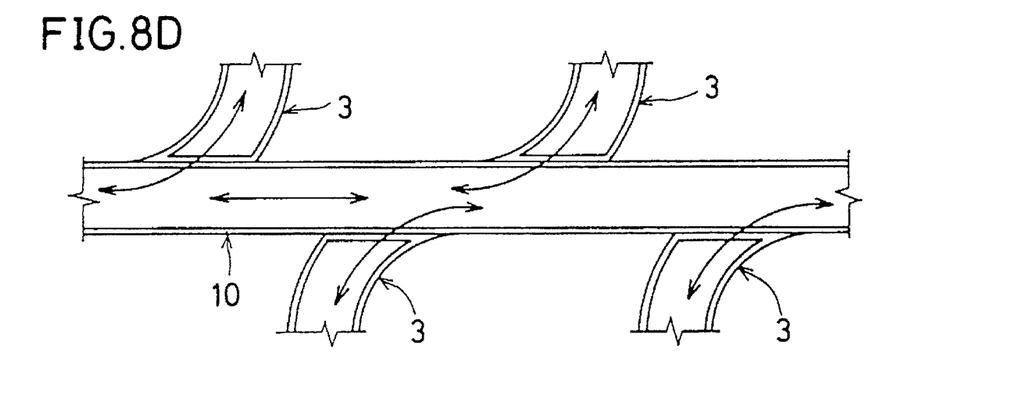

In the above embodiment, the auxiliary conveyors 3 have been disposed at opposed positions outwardly of opposite sides of the main conveyor 10; however, the arrangement may be of a type in which as shown in FIG. 8B, the auxiliary conveyor 3 is disposed only at one side. Further, as shown in FIG. 8C, the arrangement may be of a type in which differently directed auxiliary conveyors 3 are disposed on opposite sides, or as shown in FIG. 8D it may be of a type in which differently directed auxiliary conveyors 3 are staggered in the direction of the transport path 9.

In the above embodiment, stationary rollers 15 have been disposed both upstream and downstream of the movable rollers 16; however, all rollers may be movable rollers 16.

Further, in the above embodiment, a reversible driving type has been employed for the rotation imparting device 50 and the movable rollers 16 have been divided between the intermediate zones 9B and end zones 9C upstream and downstream of the central zones 9A; however, the rotation imparting device 50 may be of a unidirectional driving type while omitting the intermediate zone 9B and end zone 9C disposed on the downstream side.

In the above embodiment, the connecting members 32, 34 and 36 have been used as the angle changing device 30; however, the present invention is applicable to another type in which torque is imparted to the cylindrical bodies 23. Further, the belt 58 has been used as the rotation imparting device 50; however, it may be of a type using a chain or the like.

In the above embodiment, a number of vertical pin joint holes 24 have been formed in the roller frames 18 to make the joint positions changeable; however, the invention is applicable to an invariable type or a type which allows the joint positions to be changed by slide means.

In the above embodiment, the drive roller conveyor type has been employed respectively for the carrying-in conveyor 1, carrying-out conveyor 2 and auxiliary conveyors 3; however, these may be belt conveyors. Further, in the above embodiment, the drive type auxiliary conveyors 3 have been disposed on opposite sides outwardly of the main conveyor 10; however, non-drive type auxiliary conveyors 3 may be substituted. Further, in the present invention, a type may be used in which the auxiliary conveyors 3 are replaced by chute devices.

Figure 9:
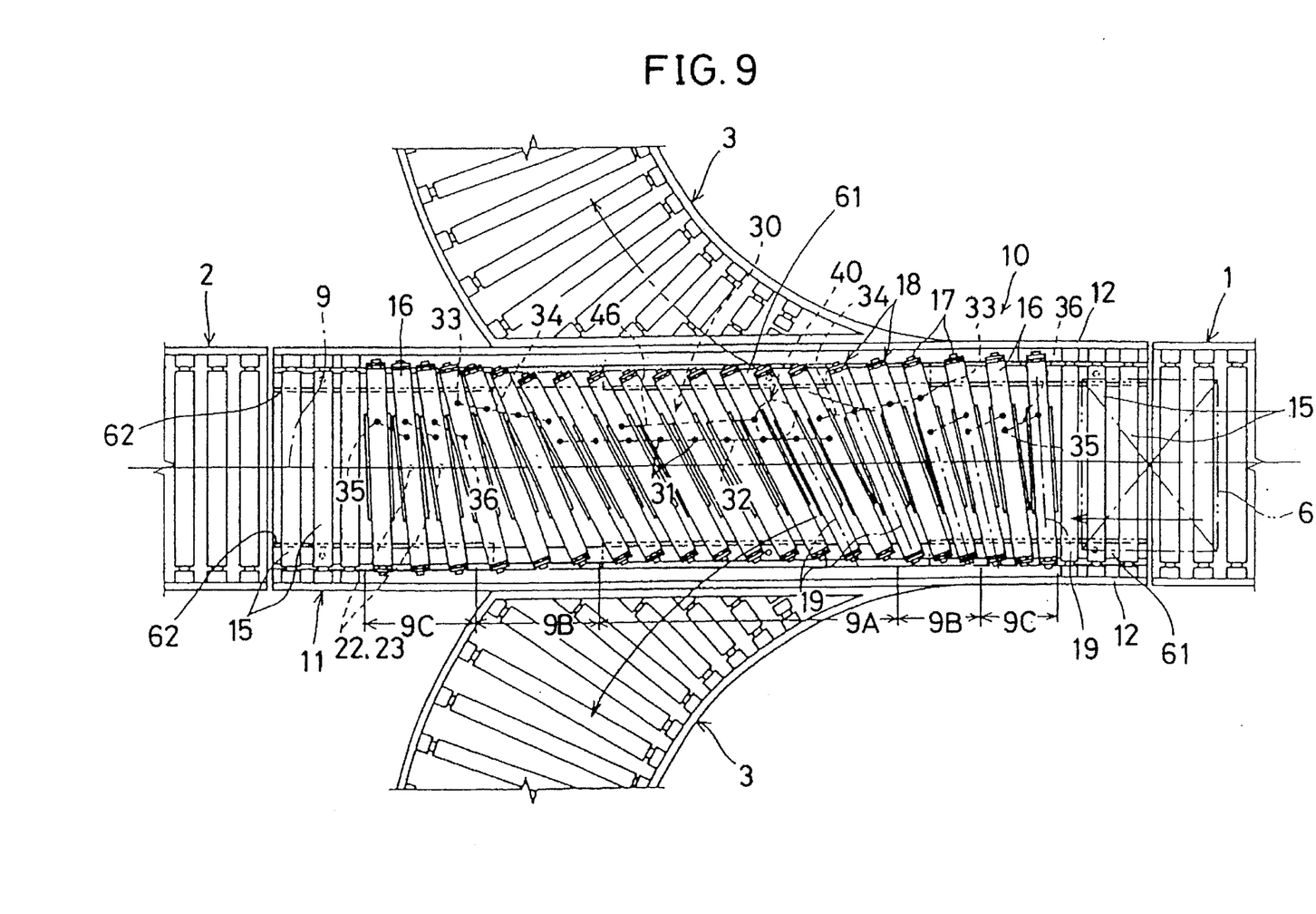
FIG. 9 is a schematic plan view of another embodiment of the invention, showing the diverging action of a conveyor system for divergence and convergence.
Figure 10:
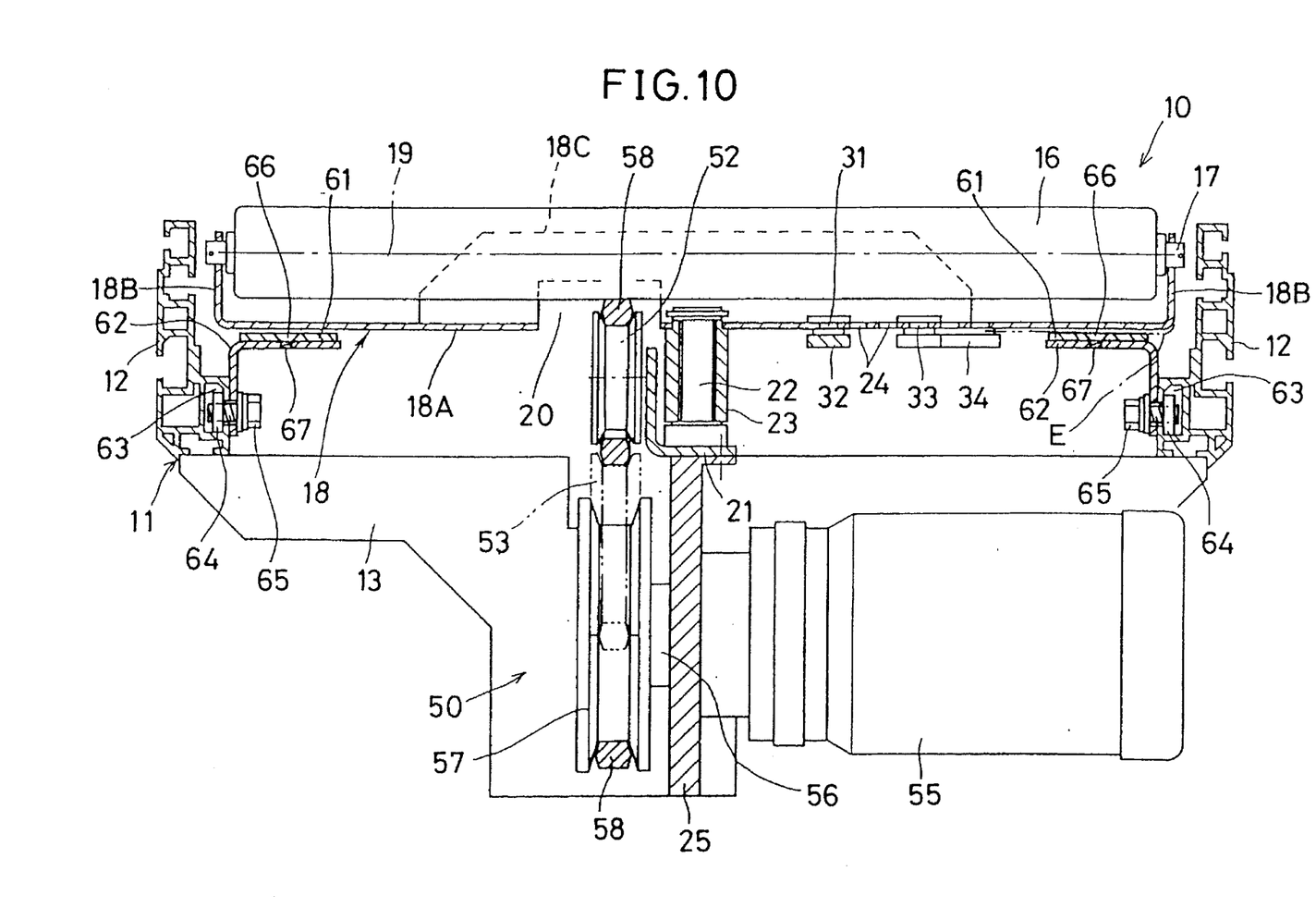
FIG. 10 is a front view, partly broken away, of the principal portion of said conveyor system for divergence and convergence.
Figure 11:
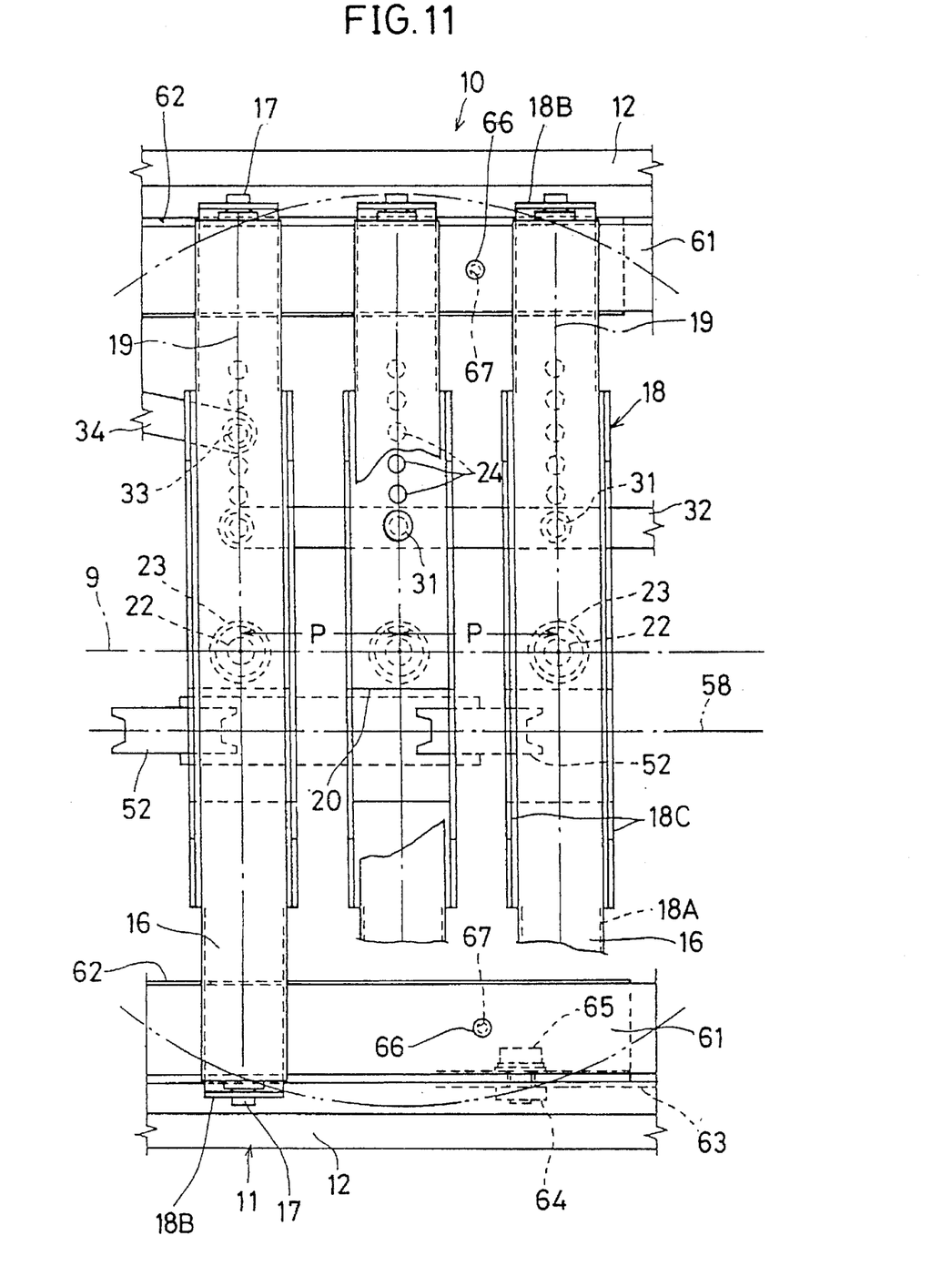
FIG. 11 is a plan view of the principal portion of said conveyor system for divergence and convergence.

FIGS. 9 through 11 show another embodiment of the invention. Support members 61 opposed from below to the ends of the roller frames 18 are disposed on the machine frame 11. The support members 61 are in plate rail form, made, e.g., of resin (or metal) and are disposed as a pair along the transport path 9 and opposed from below between the ends of the rollers frames 18.

In disposing the support members, a plurality of brackets 62 in the form of angle members are attached at suitable intervals to the inner lateral surfaces of a pair of conveyor frames 12. Attachment of the brackets 62 is effected by positioning nuts 64 in dovetail grooves 63 formed in the conveyor frames 12 and inserting bolts 65 from the inner side into the vertical plates of the brackets 62 for threaded engagement with the nuts 64.

Further, the transverse plates of the brackets 62 are directed inward at upper positions and said support members 61 are placed on the transverse plates of the longitudinal brackets 62. Flush head screws 66 inserted from above into said support members 61 are threadedly fitted in threaded holes 67 formed in the transverse plates, whereby the support members 61 are attached to the conveyor frames 12 through the brackets 62. At this time, the support members 61 are disposed with their upper surfaces in sufficient proximity (with slight clearances) to the lower surfaces of the end portions of the bottom plates 18A of the roller frames 18.

According to this different embodiment, when the article 60 is not being supported and transported, or when it is supported and transported downstream in the transport path 9 without being sorted, since there is no eccentric load on the movable rollers 16 and on the roller frames 18, the lower surfaces of the end portions of the bottom plates 18A of the roller frames 18 are opposed to the support members 61 with a slight clearance therebetween, as shown in solid lines in FIG. 10.

And the roller frames 18 are deformed and inclined such that the sorting ends assume a lower level as the load is moved during sorting transport, owing to clearances (plays) produced between the cylindrical bodies 23 and the vertical shafts 22 which provide one-point support at the center or owing to the weight of the article 60, as when the article 60 is sorted for transfer to either of the auxiliary conveyors 3. At this time, as shown in a phantom line E in FIG. 10, the lower surface of the end portion of the bottom plate 18A abuts against the upper surface of the support plate 61 and is thereby supported, with the result that further deformation and inclination are prevented. Therefore, sorting movement from the main conveyor 10 to the auxiliary conveyor 3 can always be smoothly effected without further deformation or inclination of the roller frames 18 due to the weight of the article 60 or the like.

In addition, long plate rail-like members opposed to all roller frames 18 have been shown as the support members 61; however, each support member may be divided into a plurality of pieces in the direction of the transport path 9, each piece being opposed to a single roller frame 18 or a plurality of roller frames 18. Further, the support members 61 may be attached directly to the conveyor frames 12 to omit the brackets 62.

What is claimed is:

1. A conveyor system for divergence and convergence comprising
   a main conveyor defining a transport path,
   an auxiliary conveyor for divergence and convergence installed laterally outwardly of the main conveyor;
   a machine frame,
   a plurality of rollers supported in roller flames, said rollers being disposed with respect to the machine frame such that the rollers can be individually shifted in a range between a position where the roller axes are orthogonal to the direction of the transport path and a position where the roller axes are inclined with respect to the direction of the transport path;
   said rollers being divided into groups associated with a plurality of zones such that a group of rollers in a central zone adjacent to the auxiliary conveyor are inclined at a given angle in a given direction, while the angles of inclination of the rollers of other groups in zones on the upstream and downstream sides of the central zone are adjusted to be gradually variant in such a manner that the angles are gradually increased in a direction toward the auxiliary conveyor;
   an angle adjusting device for adjusting the angle of inclination of each roller of all groups;
   a rotation imparting device for rotating each roller in forward and reverse directions disposed on the machine frame, said rotation imparting device including a belt being capable of rotating in the forward and reverse directions and arranged in the vicinity of the central portion of each roller to contact therewith from below;
   a support member in a plate rail form disposed on the machine frame along the transport path, said support member opposing from below the lower surface of each end portion of the roller frame for each roller,
   wherein each roller frame has a bottom plate and from and rear plates,
   a downwardly concave portion extending from the bottom plate to both from and rear plates of the roller frame is formed in the vicinity of the central portion of the roller frame,
   each roller is supported by the roller frame in a manner that the roller is rotatably pivoted on the roller axis extending in the transverse direction, said roller frame being rotatably attached to the machine frame through a vertical shaft, and
   wherein the belt capable of rotating in the forward and reverse directions abuts against the lower surface of the roller exposed from the downwardly concave portion.

2. A conveyor system for divergence and convergence as set forth in claim 1, wherein adjacent roller flames are swingably connected relative to each other by means of a connecting member, the connecting position of which can be shifted in the direction of the roller axis, a swing imparting device having a crank link, and at least one roller frame is linked with the crank link of the swing imparting device.

3. A conveyor system for divergence and convergence comprising a main conveyor defining a transport path, an auxiliary conveyor for divergence and convergence installed laterally outwardly of the main conveyor;

a machine frame, a plurality of rollers supported in roller frames, said rollers being disposed with respect to the machine frame such that the rollers can be individually shifted in a range between a position where the roller axes are orthogonal to the direction of the transport path and a position where the roller axes are inclined with respect to the direction of the transport path;

said rollers being divided into groups associated with a plurality of zones such that a group of rollers in a central zone adjacent to the auxiliary conveyor are inclined at a given angle in a given direction, while the angles of inclination of the rollers of other groups in zones on the upstream and downstream sides of the central zone are adjusted to be gradually variant in such a manner that the angles are gradually increased in a direction toward the auxiliary conveyor;

an angle adjusting device for adjusting the angle of inclination of each roller of all groups;

a rotation imparting device for rotating each roller in forward and reverse directions disposed on the machine frame, said rotation imparting device including a belt being capable of rotating in the forward and reverse directions and arranged in the vicinity of the central portion of each roller to contact therewith from below;

a support member in a plate rail form disposed on the machine frame along the transport path, said support member opposing from below the lower surface of each end portion of the roller frame for each roller, wherein adjacent roller flames are swingably connected relative to each other by means of a connecting member, the connecting position of which can be shifted in the direction of the roller axis, a swing imparting device having a crank link, and at least one roller frame is linked with the crank link of the swing imparting device.

* * * * *

UNITED STATES PATENT AND TRADEMARK OFFICE
CERTIFICATE OF CORRECTION

PATENT NO. : 5,653,325
DATED : August 5, 1997
INVENTOR(S) : Masahiro Enomoto

It is certified that error appears in the above-indentified patent and that said Letters Patent is hereby corrected as shown below:

Col 10, Line 54 change "from" to "front"

Signed and Sealed this

Fourth Day of August, 1998

Attest:

BRUCE LEHMAN

Attesting Officer     Commissioner of Patents and Trademarks